United States Patent
Wilhelmsson et al.

(10) Patent No.: US 7,680,218 B2
(45) Date of Patent: Mar. 16, 2010

(54) METHOD AND APPARATUS FOR COMMUNICATION CHANNEL ESTIMATION

(75) Inventors: Leif Wilhelmsson, Dalby (SE); Bo Bernhardsson, Lund (SE); Per-Ola Larsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 875 days.

(21) Appl. No.: 11/438,874

(22) Filed: May 23, 2006

(65) Prior Publication Data
US 2007/0092012 A1    Apr. 26, 2007

Related U.S. Application Data

(60) Provisional application No. 60/729,859, filed on Oct. 25, 2005.

(51) Int. Cl.
*H04L 27/06*    (2006.01)
*H04W 4/00*    (2009.01)

(52) U.S. Cl. .................. 375/340; 370/338

(58) Field of Classification Search .......... 375/260, 375/262, 265, 267, 340–342, 346–347; 370/208, 370/338
See application file for complete search history.

(56) References Cited

U.S. PATENT DOCUMENTS

| | | | |
|---|---|---|---|
| 5,581,580 A | 12/1996 | Lindbom et al. | |
| 6,680,969 B1 | 1/2004 | Molnar et al. | |
| 6,834,076 B2 | 12/2004 | Xu | |
| 6,868,276 B2 * | 3/2005 | Nissila ............... | 455/504 |
| 6,907,026 B2 | 6/2005 | Akiyama | |
| 2004/0076244 A1 | 4/2004 | Juntti et al. | |
| 2004/0184399 A1 | 9/2004 | Chiou | |
| 2004/0240570 A1 | 12/2004 | Alard et al. | |
| 2005/0170781 A1 | 8/2005 | Jacobsen et al. | |
| 2005/0174929 A1 | 8/2005 | Hayashi et al. | |
| 2006/0007898 A1 * | 1/2006 | Maltsev et al. ......... | 370/338 |

FOREIGN PATENT DOCUMENTS

| | | |
|---|---|---|
| EP | 1 355 467 | 10/2003 |
| EP | 1 463 252 | 9/2004 |

(Continued)

OTHER PUBLICATIONS

Pahlavan et al., "Wideband Frequency and Time Domain Models for the Indoor Radio Channel," Global Telecommunications Conference, Dec. 1991, pp. 1135-1140, vol. 3, XP-10042581.

(Continued)

*Primary Examiner*—Khanh C Tran
(74) *Attorney, Agent, or Firm*—Coats & Bennett, P.L.L.C.

(57) ABSTRACT

A method and apparatus for predicting channel estimates for non-received signal frequencies provides knowledge of propagation channel characteristics for non-received frequencies. One embodiment predicts uplink (or downlink) channel estimates based on measured downlink (or uplink) channel estimates, which is advantageous in systems having different uplink and downlink frequencies. Another embodiment predicts channel responses for non-received OFDM sub carrier frequencies based on measuring channel responses for received OFDM sub carrier frequencies. Such processing may comprise, for example, measuring channel responses for received OFDM pilot sub carriers, predicting channel responses at frequency intervals corresponding to pilot sub carrier spacing, and interpolating between those values to predict channel responses at data sub carrier frequencies.

26 Claims, 3 Drawing Sheets

FOREIGN PATENT DOCUMENTS

| | | |
|---|---|---|
| EP | 1 580 948 | 9/2005 |
| GB | 2 372 181 | 8/2002 |
| KR | 1020030065830 | 8/2003 |
| WO | WO 94/28661 | 12/1994 |
| WO | WO 02/067460 | 8/2002 |
| WO | WO 2004/073276 | 8/2004 |
| WO | WO2004/079969 | 9/2004 |
| WO | WO 2005/081486 | 9/2005 |

OTHER PUBLICATIONS

Coleri et al, "Channel Estimation Techniques Based on Pilot Arrangement in OFDM Systems," IEEE Transactions on Broadcasting, Sep. 2002, pp. 223-229, vol. 48, No. 3, XP-11070267.

Larsson, Per-Ola., "Modeling and Prediction of Radio Channels for OFDM." 5 pages. Part of A Master Thesis.

Cao, Weifeng and Wang, Wenbo., "A Frequency-Domain Channel Prediction Algorithm In Wideband Wireless Communication Systems." In Proceedings of the 15$^{th}$ IEEE International Symposium on Personal, Indoor and Mobile Radio Communications (PIMRC'04), Sep. 5-8, 2004, pp. 2402-2405, vol. 4.

Han, Ki-Young et. al., "Channel Estimation for OFDM with Fast Fading Channels Modified Kalman Filter." In IEEE Transactions on Consumer Electronics, May 2004, pp. 443-449, vol. 50, Issue 2.

Huang, Yiteng (Arden) and Benesty, Jacob., "A Class of Frequency-Domain Adaptive Approaches to Blind Multichannel Identification". In IEEE Transactions on Signal Processing, Jan. 2003, pp. 11-24, vol. 51, No. 1.

Hwang, Tae Jin et. al., "Adaptive OFDM with Channel Predictor over Frequency-Selective and Rapid Fading Channel." In Proceedings of the 14$^{th}$ IEEE International Symposium on Personal, Indoor and Mobile Radio Communications (PIMRC'03), Sep. 7-10, 2003, pp. 859-863.

Münster, M. and Hanzo, L., "MMSE Channel Prediction Assisted Symbol-by-symbol Adaptive OFDM." In IEEE International Conference on Communications (ICC 02), Apr. 28-May 5, 2002, pp. 416-420, vol. 1.

Schafhuber, Dieter and Matz, Gerald., "MMSE and Adaptive Prediction of Time-Varying Channels for OFDM Systems." In IEEE Transactions on Wireless Communications, Mar. 2005, pp. 593-602, vol. 4, No. 2.

Semmelrodt, Sven and Kattenbach, Ralf., "A 2-D Fading Forecast of Time-Variant Channels Based on Parametric Modeling Techniques." In Proceeding of the 13$^{th}$ IEEE International Symposium on Personal, Indoor and Mobile Radio Communications (PIMRC'02), Sep. 16-18, 2002, pp. 1640-1644.

Sternad, Mikael and Aronsson, Daniel., "Channel Estimation And Predication For Adaptive OFDMA/TDMA Uplinks, Based on Overlapping Pilots." In Proceedings of IEEE International Conference on Acoustics, Speech and Signal Processing (ICSSSP'05), Mar. 2005, pp. 861-864, vol. 3.

Sternad, Mikael and Aronsson, Daniel, "Channel Estimation and Prediction for Adaptive OFDM Downlinks." IEEE 58$^{th}$ Vehicular Technology Conference (VTC'03 Fall), Oct. 6-9, 2003, pp. 1283-1287, vol. 2.

Takaoka, Shinsuke and Fumiyuki, Adachi, "Frequency-Domain Adaptive Prediction Iterative Channel Estimation for OFDM Signal Reception." In IEICE Transactions on Communications, Apr. 2005, pp. 1730-1734, vol. E88-B, No. 4.

Wong, Ian C. et. al., "Long Range Channel Predication for Adaptive OFDM Systems." In Proceedings of the IEEE Asilomar Conference on Signals, Systems, and Computers, Nov. 7-10, 2004, pp. 732-736, Pacific Grove, CA, USA.

Wong, Ian C. and Evans, Brian L., "Joint Channel Estimation and Prediction for OFDM Systems." To appear in Proceedings of IEEE Global Telecommunications Conference, Nov. 28-Dec. 2, 2005, 5 pages, Draft Retrieved on http://www.ece.utexas.edu/~bevans/papers/2005/estimationPrediction/.

Yang, Tung-Sheng et. al., "Long Range Fading Prediction to Enable Adaptive Transmission at Another Carrier." In Proceedings of the 4$^{th}$ IEEE Workshop on Signal Processing Advances in Wireless Communications (SPAWC), Jun. 15-18, 2003, pp. 195-199.

Yang, Tung-Sheng and Hallen-Duel, Alexandria., "Adaptive Modulation Using Outdated Samples of Another Fading Channel." In Proceedings of the IEEE Wireless Communications and Networking Conference, Mar. 17-21, 2002, pp. 477-481.

Yang, Tung-Sheng and Hallen-Duel, Alexandria., "Reliable Adaptive Modulation Aided by Observations of Another Fading Channel." In IEEE Transactions on Communications, Apr. 2004, pp. 605-611, vol. 52, No. 4.

Zhang, Ruifeng and Chen, Wei., "A Mixture Kalman Filter Approach for Blind OFDM Channel Estimation." Conference Record of the Thirty-Eighth Asilomar Conference on Signals, Systems and Computers, Nov. 7-10, 2004, pp. 350-354, vol. 1.

Yang-Tung-Sheng., "Performance Analysis of Adaptive Transmission Aided by Long Range Channel Prediction for Realistic Single- and Multi-Carrier Mobile Radio Channels." PhD Dissertation, 130 pages, URN: etd-05192004-133754.

Yang-Tung-Sheng.,"Enabling Adaptive OFDM For Mobile Radio Channels." In Proceedings of 2004 IEEE Military Communications Conference (MILCOM 04), Oct. 31-Nov. 3, 2004, pp. 704-710.

Larsson, Per-Ola., "Modeling and Prediction of Radio Channels for OFDM." 5 pages. Part of A Master Thesis, 2005.

Yang-Tung-Sheng., "Performance Analysis of Adaptive Transmission Aided by Long Range Channel Prediction for Realistic Single- and Multi-Carrier Mobile Radio Channels." PhD Dissertation, 130 pages, URN: etd-05192004-133754, 2004, Raleigh.

* cited by examiner

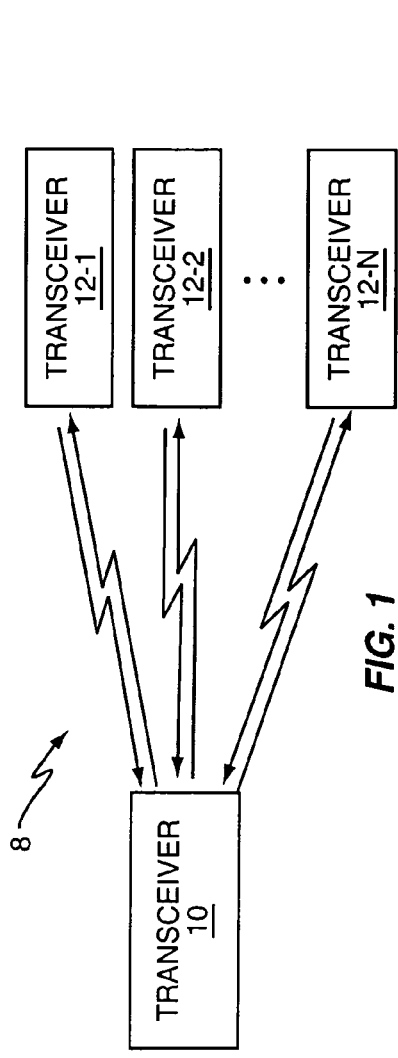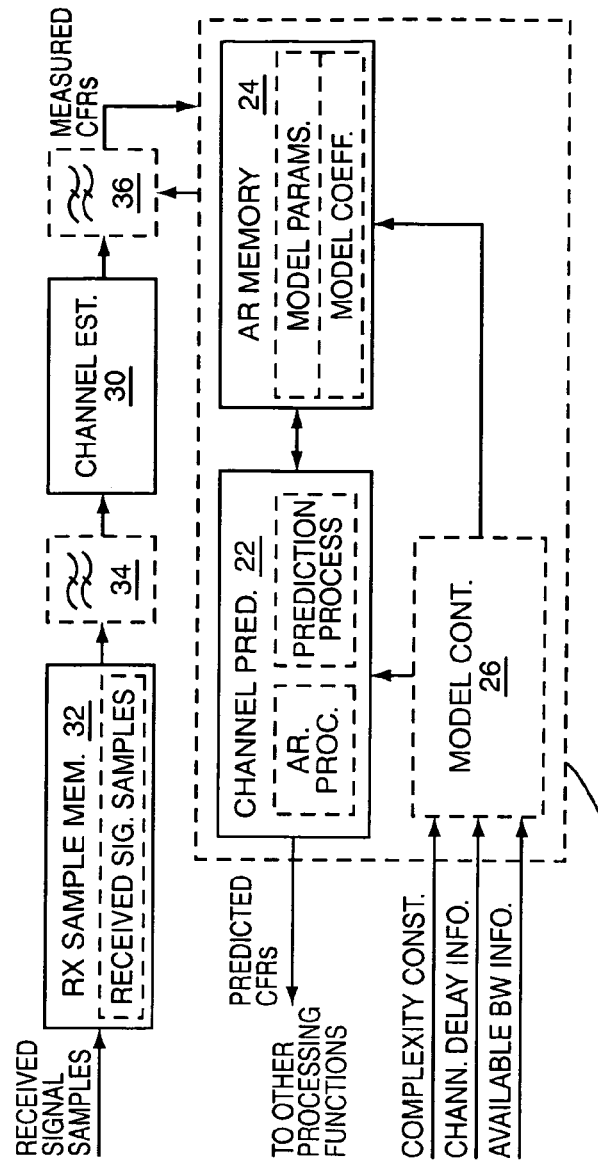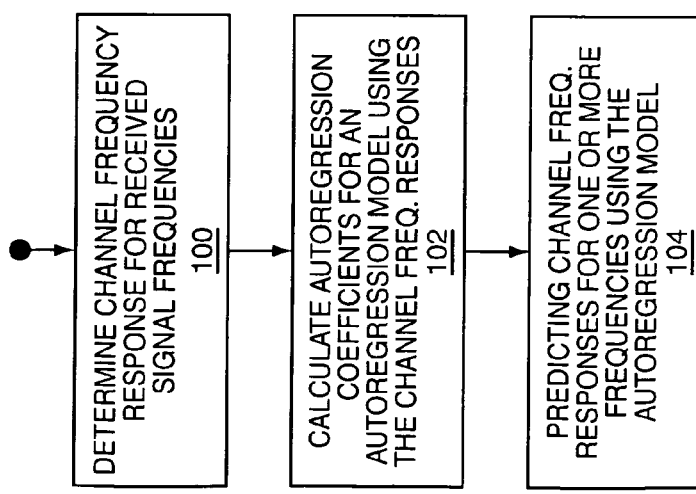

METHOD AND APPARATUS FOR COMMUNICATION CHANNEL ESTIMATION

RELATED APPLICATIONS

This application claims priority under 35 U.S.C. §119(e) from the provisional patent application entitled "System and Methods for Channel Prediction and Adaptive Transmission in OFDM Systems," filed on 25 Oct. 2005 and assigned Ser. No. 60/729,859, and which is incorporated herein by reference.

BACKGROUND

The present invention generally relates to communication systems and signals, and particularly relates to communication channel estimation.

Reliable data reception depends on accurate channel estimation. For example, channel estimates may be used to compensate unknown received data symbols for expected channel distortion, thereby improving symbol demodulation. Channel estimates also play a key role in channel quality estimation, which is an increasingly important aspect of rate and/or power control in evolving wireless communication systems, such as Wideband Code Division Multiple Access (WCDMA) systems.

As a general proposition, one may assume that the propagation channels are frequency selective, meaning that channel estimation for a given propagation channel is frequency dependent. Frequency dependency complicates channel estimation where it is useful to have channel estimates for multiple frequencies of interest. For example, Orthogonal Frequency Division Multiplexing (OFDM) transmission uses a plurality of sub carriers distributed across a given frequency range, where the sub carriers are orthogonal to one another. OFDM finds use in a variety of systems, such as the 802.11a/g standards for Wireless Local Area Networks (WLANs). Evolving wide area communication standards, such as the Universal Mobile Terrestrial Systems (UMTS) standards, also contemplate the use of OFDM.

Several aspects of OFDM make it particularly advantageous for wireless transmissions in multiple access systems. For example, the sub carrier data rate can be varied to suit frequency-dependent channel conditions that vary across sub carriers. Further, different subsets of different sub carriers may be used to serve different users, allowing concurrent transmissions to/from potentially many different users in a wireless communication system.

Thus use of OFDM presents several challenges in terms of channel estimation, however. For example, the particular sub carriers assigned to a particular user may not represent the optimal assignment for that user—i.e., other ones of the sub carriers may offer better performance given the frequency-dependent nature of channel conditions. However, optimizing sub carrier assignments for users is not possible without having channel estimates available for the non-assigned frequencies.

SUMMARY

According to a method and apparatus taught herein, a communication receiver, configured for wireless or wired communication, generates channel estimates for non-received signal frequencies using an autoregressive prediction method. In one embodiment, a method of determining channel estimates for non-received signal frequencies comprises determining a plurality of channel frequency responses for a plurality of received signal frequencies, calculating autoregression coefficients for an autoregression model using the plurality of channel frequency responses, and predicting channel frequency responses for one or more frequencies outside the received signal frequencies using the autoregression model. The method may be embodied in one or more receiver circuits and may, for example, comprise computer code for execution on a special or general-purpose microprocessor, digital signal processor, ASIC, FPGA, or the like.

In one or more embodiments, a receiver circuit is configured to combine the use of an autoregressive model for channel prediction—frequency and/or time prediction—with interpolation and/or extrapolation processing. For example, the receiver circuit can use extrapolation to obtain channel responses outside the range of received signal frequencies, and interpolation can be used to predict channel responses in between measured or predicted channel responses.

Predicting channel response for non-received frequencies provides advantages in a number of applications. By way of non-limiting example, such methods may be used to predict channel responses for uplink signal frequencies, based on channel response measurements obtained for received downlink signal frequencies, or vice versa.

As another example, channel response prediction may be used in a method of assigning subsets of OFDM data sub carriers to respective ones in a plurality of communication receivers, which may be wired or wireless. In one embodiment, the method comprises, for each wireless communication receiver, measuring channel estimates for OFDM sub carrier frequencies currently assigned to the communication receiver, and predicting channel estimates for OFDM sub carrier frequencies not currently assigned to the communication receiver via autoregression modeling based on the measured channel estimates, jointly evaluating measured and predicted channel estimates for the communication receivers, and assigning particular OFDM data sub carriers to particular communication receivers based on said joint evaluation.

In one embodiment, a receiver circuit is configured to predict channel responses for non-received OFDM sub carrier frequencies based on measuring channel responses for received OFDM sub carrier frequencies. Such processing may comprise, for example, measuring channel responses for received OFDM pilot sub carriers, predicting channel responses at frequency intervals corresponding to pilot sub carrier spacing, and interpolating between those values, or extrapolating, to predict channel responses at data sub carrier frequencies.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a partial block diagram of one embodiment of a wireless communication network including one or more transceivers configured for channel estimate prediction as taught herein.

FIG. 2 is a logic flow diagram of one embodiment of channel prediction processing logic, such as can be implemented as computer code for execution by a microprocessor circuit or the like.

FIG. 3 is a block diagram of one embodiment of channel prediction processing circuits.

DETAILED DESCRIPTION

Figure 4:
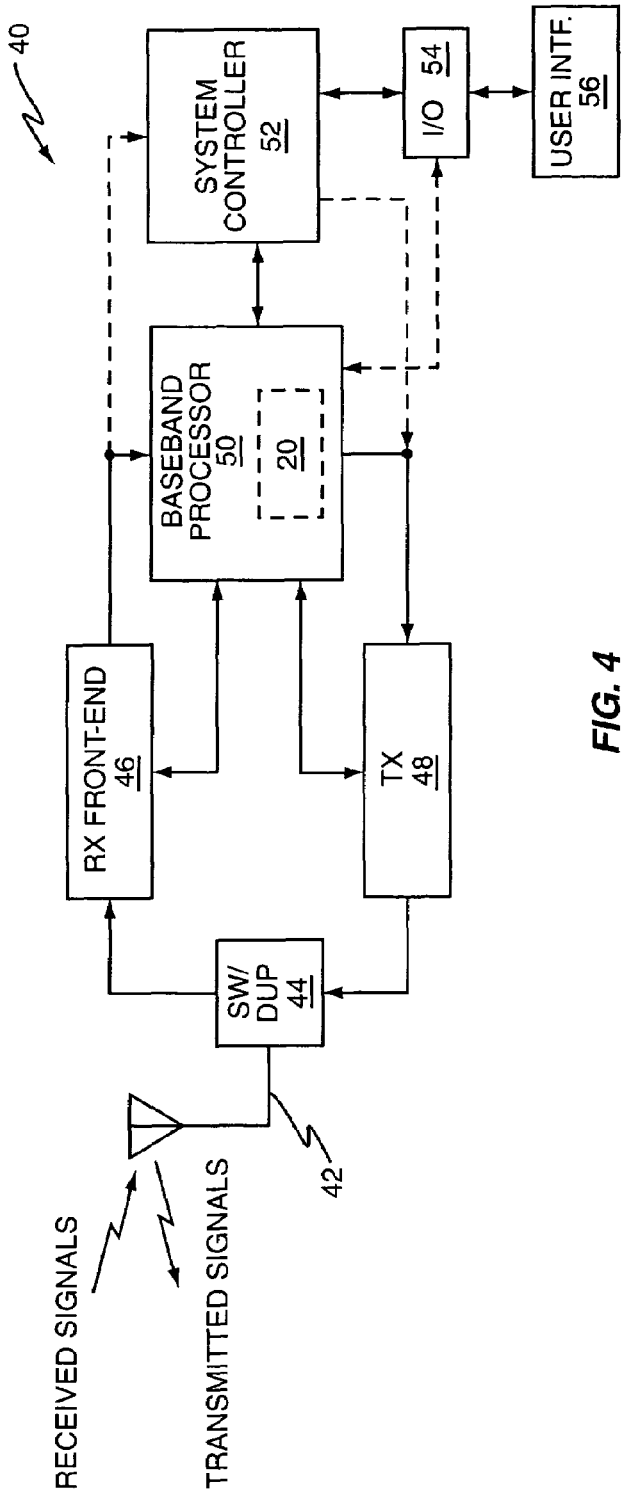
FIG. 4 is a block diagram of one embodiment of a wireless communication device configured for channel prediction.

FIG. 1 partially illustrates a wireless communication network or system 8, comprising one or more first transceivers 10 and one or more second transceivers 12. Multiple instances of transceivers 12 are denoted as 12-1, 12-2, and so on. In one embodiment, the transceiver 10 comprises a base station and the transceivers 12 comprise mobile communication devices, such as cellular radiotelephones, or other types of access terminals.

By way of non-limiting example, the transceiver 10 may comprise a Wideband CDMA (WCDMA) base station—e.g., a radio network controller and corresponding Node B transceiver systems. In other embodiments, the transceivers 10 and 12 comprise WLAN transceivers, such as 802.11a/g transceivers. In other embodiments, the transceivers 10 and 12 comprise digital broadcasting transmitters/receivers, and may be configured for DVB-T, DVB-H, or DAB standards.

In any case, according to methods and apparatus taught herein, any one or more of the transceivers 10 and 12 are configured to predict channel estimates, also referred to herein as channel frequency responses, for non-received signal frequencies. For example, the transceiver 10 may be configured for Orthogonal Frequency Division Multiplexing (OFDM) transmission, wherein it transmits data to respective ones of the transceivers 12 using different data sub carriers, with each sub carrier at a different frequency.

More specifically, OFDM transmitters transmit data in parallel on a potentially large number of sub carriers, which are orthogonal to one another in the frequency domain. An OFDM (information) symbol is commonly generated by using an inverse fast Fourier transform (IFFT) of size N, where typical values of N are $64 \leq N \leq 8192$. OFDM transmission effectively places different transmit data on different bins at the input of the IFFT, i.e., different data is transmitted using different sub carriers or sets of sub carriers.

Consequently, sub carriers of different frequencies can experience dramatically different channel effects if the radio propagation channel is frequency selective. Thus, the methods and apparatus taught herein may be used to predict channel estimates for OFDM sub carrier frequencies not currently being received. Of course, channel frequency response prediction is not limited to OFDM applications.

For example, transmissions from the transceiver 10 to the transceivers 12 may be considered "downlink" transmissions, while transmissions from respective ones of the transceivers 12 to the transceiver 10 may be considered "uplink" transmissions. In Frequency Division Duplex (FDD) applications, the uplink and downlink channel frequencies occupy different frequency bands in the radiofrequency spectrum. Thus, channel frequency response prediction can be used at the transceivers 12 to predict channel frequency responses for the uplink, based on channel frequency response measurements made for the downlink. Such predictions are particularly appropriate where the uplink and downlink occupy adjacent frequency bands.

FIG. 2 broadly illustrates channel frequency prediction processing, which may be embodied in any or all of the transceivers 10 and 12, using hardware, software, or any combination thereof. In at least one embodiment, the processing logic of FIG. 2, or variations of the illustrated logic, is embodied as a computer product comprising computer code for execution on an appropriately configured general or special purpose microprocessor, digital signal processor, or other such processing circuit. While not so limited, channel frequency prediction is in one embodiment implemented in a baseband signal processor, which is associated with received signal processing.

In any case, the processing of FIG. 2 begins with determining channel frequency responses for one or more received signal frequencies (Step 100). Using the transceiver 12-1 as a context for discussion, one may assume that the transceiver 12-1 receives signals from the transceiver 10 at two or more frequencies, and determines channel estimates for these frequencies based on processing received signal samples.

Processing continues with the determination of autoregression (AR) coefficients for a given AR model (Step 102), the defining parameters of which may be statically or dynamically stored in a memory circuit of the transceiver 12-1. (In some embodiments, default parameters for determining the AR model are stored in non-volatile memory, while working parameters, which may be copies of the default parameters and/or dynamically adjusted parameters, are stored in a working memory.) At least a portion of the (measured) channel frequency responses determined for received signal frequencies are used to determine the AR model, and such measurements are also used to initialize coefficients of the determined AR model. The AR model with its determined coefficients is then used to predict channel frequency responses for one or more non-received signal frequencies (Step 104).

With FIG. 2 in mind, and by way of non-limiting example, FIG. 3 depicts functional circuits that may be used in association with predicting channel frequency responses as taught herein. More particularly, FIG. 3 illustrates one or more channel prediction processing circuits 20, including a channel prediction circuit 22, which includes or is associated with one or more memory circuits 24, and an optional model controller 26. Further included or associated with the processing circuits 20 are a channel estimation circuit 30, which is coupled to a received signal sample memory 32 through an optional sample filter 34. Notably, the channel prediction processing circuits 20 may be implemented in hardware and/or software, such as by providing computer code in the form of executable program instructions for a digital signal processor or the like.

In operation, the channel estimation circuit 30 produces channel estimates—measured channel frequency responses (CFRs)—for a number of received signal frequencies, based on received signal samples held in the sample memory 32. Optionally, the measured channel frequency responses are filtered via an optional filter 36 before they are provided to the channel prediction processing circuits 20. Such filtering can be implemented to improve signal-to-noise ratios (SNR). In this context, sample filtering may be understood as an averaging process. Sample averaging works well where the sample values do not vary significantly over the averaging time. Thus, sample averaging can be used to improve SNR during times when the propagation channel conditions are varying slowly—slow fading conditions. Conversely, filtering the samples during fast fading conditions can introduce distortions. The processing circuits 20 can be configured to select filtering or no filtering, as a function of channel conditions, and can be configured to apply varying amounts of filtering, depending on whether the channel conditions are changing more slowly or more rapidly. Evaluating output from the channel estimation circuit 30 provides a basis for such adjustment. Also, in at least some embodiments, the accuracy of the predicted channel characteristics can be evaluated directly or indirectly as a basis for applying more or less filtering, or for selectively filtering or not filtering.

In turn, the channel prediction circuit 22 implements an AR process (algorithm), in which it uses the measured channel frequency responses from the channel estimation circuit 30 to determine the AR model. After the AR model is determined, a portion of the measured channel frequency responses are used to initialize the model. Parameters related, for example, the desired model order, may be stored in memory. As a non-limiting example, the channel prediction circuit 22 receives a hundred measured channel frequency response samples, filtered or otherwise, and uses some number of them to determine the AR model, and some (smaller) number of them to initialize the model.

The channel prediction circuit 22 then uses the initialized model to predict channel frequency responses for one or more non-received signal frequencies of interest. For instance, extrapolation to adjacent frequencies can be done. Further, once predicted channel estimates are available, the processing circuits 20 may be configured to use an interpolation process to predict additional channel frequency responses for frequencies between the initial frequencies of interest. For example, if received pilot tones are used to generate the measured channel frequency responses for determining and initializing the AR mode, then the AR model can be used to predict channel frequency responses on the same frequency interval, but the processing circuits 20 can be configured to predict data tone channel frequency responses between the pilot tone intervals.

According to the above configuration of the processing circuits 20, an access terminal or other wireless communication device or system can be configured to, for example, receive data at a plurality of signal frequencies, generate channel estimates for the received frequencies, and then predict channel estimates for non-received signal frequencies. FIG. 4 illustrates a wireless communication device 40, which includes an embodiment of the processing circuits 20 and may be understood as representing one embodiment of the transceivers 12 more generally illustrated in FIG. 1.

More particularly, the wireless communication device 40 should be understood as comprising a cellular radio telephone, wireless pager, Portable Digital Assistant (PDA), laptop or palmtop computer, or communication card therein, or other type of mobile communication device. In the illustrated embodiment, the wireless communication device 40 comprises a transmit/receive antenna 42, a switch and/or duplexer 44, a receiver front-end circuit 46, a transmitter circuit 48, one or more baseband processing circuits 50, a system controller 52, input/output (I/O) circuits 54, and a user interface 56, which may include audio input/output, keypad, display, etc. Those skilled in the art will appreciate that the illustrated architecture and circuits may be varied according to the intended purpose of the wireless communication device 40. In one or more embodiments, the wireless communication device 40 is configured for OFDM reception, and may comprise, for example, a cellular radiotelephone or other portable communication device.

In understanding channel frequency response prediction in more detail, it is helpful to observe that for multipath reception a received complex baseband signal may be represented as $$r(t) = \sum_{n=1}^{N} \alpha_n(t) \underline{s}(t - \tau_n(t)) e^{j(2\pi f_{D_n}(t)t + \theta_n)} \quad \text{Eq. (1)}$$

where the subindex n corresponds to signal path n, and N represents the total number of paths, i.e., multipath signal copies. Eq. (1) implies that the baseband channel can be modeled as a linear time-variant filter with the equivalent baseband impulse response, given as $$\underline{c}(t, \tau) = \sum_{n=1}^{N} \alpha_n(t) e^{j(2\pi f_{D_n}(t)t + \theta_n)} \delta(\tau - \tau_n(t)) \quad \text{Eq. (2)}$$

at time t−τ, where t represents real time and τ represents time within the impulse response.

The time variant frequency response of the channel is obtained by taking the Fourier transform with respect to τ, given as, $$\begin{aligned} \underline{C}(t, f) &= \int_{-\infty}^{\infty} \underline{c}(t, \tau) e^{-j2\pi f \tau} d\tau \quad \text{Eq. (3)} \\ &= \int_{-\infty}^{\infty} \left[ \sum_{n=1}^{N} \alpha_n(t) e^{[j2\pi f_{D_n}(t)t + \theta_n]} \delta(\tau - \tau_n(t)) \right] e^{-j2\pi f \tau} d\tau \\ &= \sum_{n=1}^{N} \alpha_n(t) e^{[j2\pi f_{D_n}(t)t + \theta_n]} e^{-j2\pi f \tau_n(t)} \\ &= \sum_{n=1}^{N} \alpha_n(t) e^{j[2\pi(f_{D_n}(t)t - \tau_n(t)f) + \theta_n]} \end{aligned}$$

where $\alpha_n(t)$ represent the (multipath) attenuations, $$f_{D_n}(t) = f_c \frac{v}{c} \cos \beta_n(t)$$

represent the Doppler shifts, and $$\tau_n(t) = \frac{L_n(t)}{c}$$

represent the excess (multipath) delays.

Eq. (3) may be understood as representing the sum of N cos( ) and sin( ) functions over a range of frequencies. For an example, if the carrier frequency $f_c$=2 GHz, and the vehicle (device) speed v=110 km/h, then the maximum Doppler frequency $f_{D\,max}$=200 Hz. In any case, the equation illustrates the duality of the time and frequency dependencies, i.e., the frequency response changes if $f_{D_n}(t) \neq 0$ or $\tau_n(t) \neq 0$, because of the products $f_{D_n}(t)t$ and $\tau_n(t)f$ appearing in the equation. Also, one can see that this expression is a sum of sin(·) and cos(·) with different Doppler and excess delay differences, $f_{D_n}(t) - f_{D_m}(t)$, $\tau_n(t) - \tau_m(t)$, and phases $\theta_n - \theta_m$.

Assuming that one observes the channel over a limited time window, e.g., at a given instant of time, but over a range of frequencies, the extent that the channel changes across frequency depends on the different delays. It is also noted that if the complex amplitudes and the delays can be perfectly estimated for all the N paths, then the transfer function of the channel would be perfectly known for all frequencies. That is, with the expression for the baseband channel frequency response given in Eq. (3), one need only substitute the value f in the equation for a given frequency of interest to predict the channel frequency response at that frequency.

With C[m,k] representing $\underline{C}$(t,f) sampled with symbol rate and (pilot) sub carrier spacing, the transfer function may be represented as $$R[m,k]=C[m,k]S[m,k]+N[m,k] \qquad \text{Eq. (4)}$$

where R[m,k] represents the received symbol, C[m,k] represents the channel frequency response, S[m,k] represents the transmitted symbol, and N[m,k] represents the noise plus interference. At the pilot sample rate—i.e., at the pilot sub carrier frequency interval—and assuming the pilots equal to one and that the channel parameters are time invariant over a comparatively small time interval, one may derive the AR model from R[n], where n=1, . . . , L and the time index has been suppressed for notational convenience. That is, the channel frequency response measurements for L received pilots may be used to determine the AR model, thereby providing a basis for predicting the channel frequency response for one or more non-received frequencies.

Assuming a unity pilot and that pilot sub carriers are received at frequencies {N, N−1, . . . , N+1−p}, the channel frequency response, $\hat{C}$[N+1], for the next adjacent (but not received) pilot sub carrier frequency can be predicted using an AR model of order p as, $$\hat{C}[N+1]= -a[1]R[N]-a[2]R[N-1]- \ldots -a[p]R[N+1-p] \qquad \text{Eq. (5)}$$

where {a[1], a[2], . . . , a[p]} are the AR model coefficients. To obtain further predicted channel frequency responses at the pilot sub carrier frequency interval, one may iterate the AR model using results obtained from the previous iteration as follows $$\hat{C}[N+1] = -a[1]R[N] - a[2]R[N-1] - \ldots - a[p]R[N+1-p] \qquad \text{Eq. (6)}$$
$$\hat{C}[N+2] = -a[1]\hat{C}[N+1] - a[2]R[N] - \ldots - a[p]R[N+2-p]$$
$$\vdots$$
$$\hat{C}[N+m] = -a[1]\hat{C}[N+m-1] - \ldots - a[p]\hat{C}[N+m-p]$$

Thus, with Eq. (5) and Eq. (6) in mind, one sees that received signal samples can be used to calculate channel frequency responses for received signal frequencies and those measured responses can be used to determine AR model coefficients for a p-th order AR model. With the model coefficients thus determined using channel frequency responses for received signal frequencies, the AR model can then be used to predict channel frequency responses for one or more non-received frequencies.

In one or more embodiments, the autoregression model order is set as a function of a desired prediction depth. For example, the order of the model may be set according to the frequency distance (frequency "depth") away from received signal frequencies at which non-received signal frequency responses are being predicted. Further, the autoregression-based prediction methods and circuits taught herein can be used alternatively, or additionally, for predicting propagation channel characteristics in time, and the time distance (time "depth") can also be used to set the desired autoregression model order.

In looking at time-based channel prediction in more detail, in one embodiment, the processing circuits 20 are configured to determine how fast a propagation channel of interest is changing. This might, for example, consist of determining whether the channel should be considered fast fading or slow fading. The threshold between the two characterizations could be, for example, a Doppler rate of 50 Hz, or a vehicular speed of 30 km/h. How fast the channel is changing also could be evaluated on an essentially continuous basis, such as by using ten different Doppler rates rather than just two.

In any case, a suitable model order for the AR model can be determined in whole or in part based on the estimated Doppler, and other complexity constraints can also be considered, such as the number of received signal samples to use for determining the AR coefficients, and the spacing between such samples. The samples are used to determine the AR model and initialize its coefficients, and the initialized model is then used to make a time prediction for the channel. Interpolation can be used if channel estimates are needed for times between the prediction intervals, which is related to the spacing of the measured samples used to determine and initialize the model.

Thus, for time-based AR prediction, one embodiment of a method of predicting channel estimates comprises calculating a number of channel estimates based on received signal samples, calculating autoregression coefficients for an autoregression model using the plurality of channel estimates, predicting channel estimates for one or more future times using the autoregression model, and adapting the autoregression model as a function of channel conditions. The calculated channel estimates can be based on samples received over a given time window, or a given number of time intervals, and the time frame for such calculation may also be adjusted as a function of channel conditions. As a non-limiting example, the channel estimates generated by the channel estimator 30 can be evaluated as a basis for determining channel conditions.

Time and frequency prediction both enable the adjustment of transmission parameters to suit channel conditions that otherwise would not be known—i.e., channel conditions for non-received frequencies and/or channel conditions at future times. In that sense, both time and frequency prediction can be used in a complementary fashion. For example, assume a communication system with one base station and one mobile station, with the base station and mobile station each allocated a 10 MHz transmission bandwidth. Further assume that the mobile station's allocated 10 MHz spectrum is adjacent to the 10 MHz spectrum allocated to the base station. In this context, the prediction methods and circuits taught herein can be used to predict what transmission parameters should be used by the mobile station for transmission to the base station.

In one embodiment, the base station, which receives on a frequency band of interest, determines the channel for a current time, and uses AR-based time prediction to predict what the channel will look like the next time the mobile station transmits. The base station transmits the channel prediction to the mobile station and, in turn, the mobile station uses the time prediction to determine the transmission parameters it will use for transmitting at the predicted time. One advantage here is that the base station performs the time prediction for the correct frequency.

In another embodiment, the mobile station receives base station transmission on one or more frequencies that are adjacent (or at least nearby) one or more frequencies of interest, and uses the received frequency (or frequencies) to predict the channel(s) for the frequency (or frequencies) of interest. One advantage here is that there is little delay involved in the prediction process, because the base station is not involved. Thus, if the uplink/downlink frequencies are close enough to consider the radio channels as flat, frequency-based channel prediction may be preferred. On the other hand, time-based channel prediction may be preferred where the received frequencies are further away from the frequency of interest. Of course, the two approaches may be used together, as needed or desired.

Whether frequency prediction and/or time prediction is implemented, options exist as a matter of design choice and implementation requirements in terms of selecting a particular method for determining the AR model. One criterion to consider is determining which method best estimates the frequencies or excess delay of the sinusoids from the received signal(s). By way of non-limiting examples, possible AR model determination methods include maximum entropy, autocorrelation, covariance, modified covariance, and Burg's method. In particular, Burg's method is an advantageous method of AR model determination in at least some circumstances. For example, Burg's method may be preferred for cellular communication handsets operating according to the following environmental assumptions: maximum excess delay spread $\tau_{max}$=5 µs, maximum Doppler frequency $f_{D_{max}}$=200 Hz, and OFDM sub carrier spacing=15 KHz.

With such model determination considerations in mind, the calculation of the AR model depends essentially on three parameters which influence the prediction length and computational load: sampling frequency, model order p, and modeling window length. For time-based AR prediction, i.e., the prediction of channel estimates for times outside the measurement time, the sampling frequency depends on the Doppler frequency. For frequency prediction, the appropriate sampling frequency is related to the maximum excess delay spread of the channel. As for model order, its selection represents a trade-off between performance and complexity. Finally, regarding the modeling window length, it should be noted that the model order in Burg's method is limited by the window size. A longer modeling window improves performance for relatively slow fading conditions, but the effective performance of AR-based channel prediction modeling can suffer where long modeling windows are used in fast fading conditions.

Figure 5:
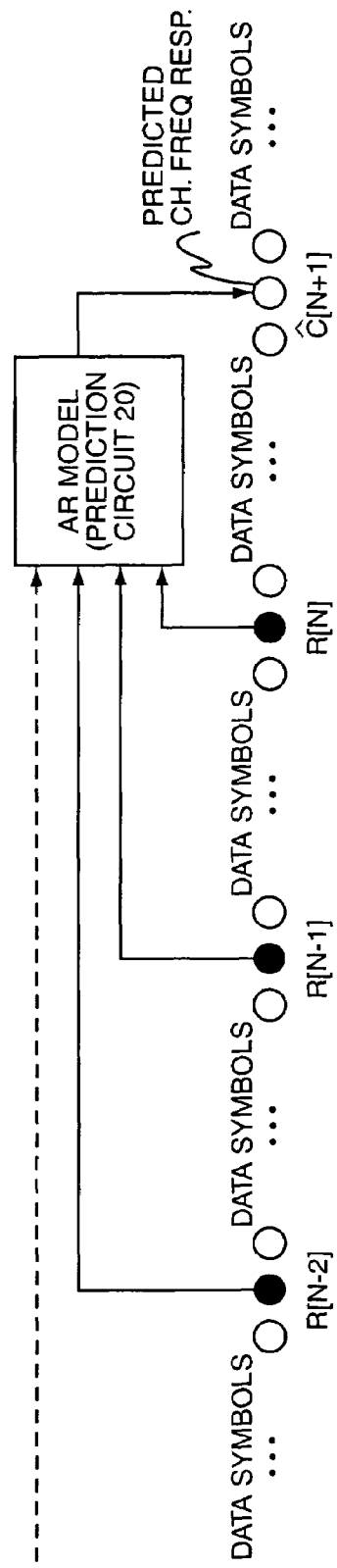
FIG. 5 is a signal diagram of one embodiment of channel measurements and channel predictions for frequency-spaced pilot sub carriers.

Whether implemented using Burg's method or another method for AR-based prediction of channel estimates for non-received signal frequencies, the wireless communication device 40 is, in one or more embodiments, configured for OFDM-based communication and employs the processing of Eq. (5) and Eq. (6) for pilot sub carriers that are distributed within a plurality of data sub carriers at uniformly spaced sub carrier frequencies. FIG. 5 illustrates one embodiment of such processing.

FIG. 5 illustrates the use of measured channel frequency responses for pilot sub carrier frequencies {R[N], R[N−1], . . . , R[N+1−p]} to determine an AR model via the prediction circuits 20 of the wireless communication device 40. After determination of the AR model and initialization of the model coefficients {a[1], a[2], . . . , a[p]}, processing continues by predicting channel frequency responses for one or more non-received pilot sub carrier frequencies, e.g., {C[N+1], C[N+2], . . . , C[N+m]}.

More broadly, the processing circuits 20 can be configured to implement a method of determining channel estimates for non-received signal frequencies comprising determining a plurality of channel frequency responses for a plurality of received signal frequencies, calculating autoregression coefficients for an autoregression model using the plurality of channel frequency responses, and predicting channel frequency responses for one or more frequencies outside the received signal frequencies using the autoregression model. In at least one embodiment, determining the channel frequency responses comprises obtaining a number of frequency response samples from received signal samples for at least some of the received signal frequencies.

Optionally, the processing circuits 20 apply filtering, such that filtered frequency response samples are used in calculating the autoregression coefficients. In any case, the complexity of the AR model can be constrained according to an allowed complexity, which could be represented as a stored value, a delay spread of the channel, which can be a dynamically updated value or a configured value, and/or a frequency bandwidth to be used for predicting channel frequency responses.

In at least one embodiment, determining the plurality of channel frequency responses comprises determining a channel frequency response for at least some sub carriers in a plurality of received OFDM sub carriers. For example, the processing circuits 20 determine channel frequency responses for one or more received pilot sub carriers, and determine an p-th order autoregression model using at least a portion of the channel frequency responses determined for the received pilot sub carriers. In other words, the processing circuits 20 can be configured to determine channel frequency responses for at least some received pilot sub carriers, and then use those measurements to determine and initialize an AR model, which is then used to predict channel frequency responses at frequency steps matching the frequency spacing used for AR-based prediction. Additional frequencies, such as for data sub carriers at frequency tones between the pilot tones can be predicted through interpolation.

With the above in mind, example values for an OFDM system may be as follows: total bandwidth is 20 MHz and sub carrier spacing 15 kHz. The sub-carrier spacing gives a symbol duration of 67 us. Distance between pilot sub carriers to be used for predictions: 90 KHz (every 6th carrier is a pilot). In case of high Doppler, say 200 Hz, prediction in the frequency direction is based on data from one OFDM symbol only, rather than being averaged over several received OFDM symbols. For low Doppler, say 10 Hz or so, samples determined over ten OFDM symbols can be used to reduce the noise. A reasonable size of the window used to obtain the AR model might be 100,i.e., 100 pilot sub carriers are used to determine the AR model. A reasonable model order is 30.Once the AR model is obtained (using 100 pilots transmitted 90 kHz apart), the channel is predicted on a grid of 90 kHz, i.e., the same spacing as is used in the AR model. Finally, the predicted channel values separated by 90 kHz are interpolated to yield predicted channel estimates at a grid of 15 kHz.

Broadly, in one or more embodiments, the prediction circuits 20 are configured to use interpolation to obtain channel frequency response predictions for one or more data sub carrier frequencies lying between pilot sub carrier frequencies. For example, interpolation may be used to predict channel frequency responses for data sub carriers between the predicted C[N+1] and C[N+2] pilot sub carrier channel frequency responses. One embodiment implements a Wiener filter for interpolation processing, wherein the filter parameters are derived from channel statistics.

Figures 6, 7:
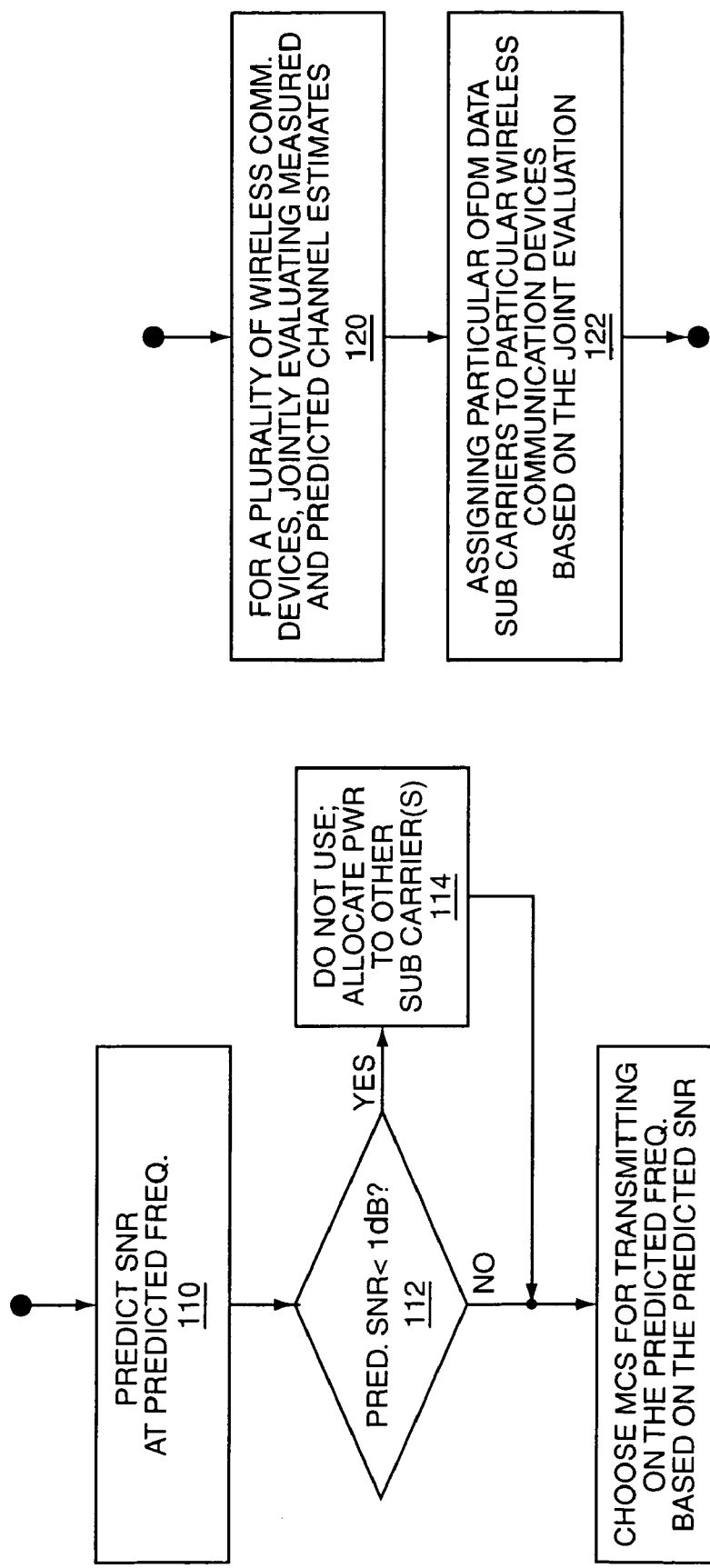
FIG. 6 is a logic flow diagram of one embodiment of transmit power allocation processing logic, based on predicted channel responses.
FIG. 7 is a logic flow diagram of one embodiment of transmit frequency (sub carrier) assignment processing logic, based predicted channel responses.

The ability to predict channel estimates for non-received signal frequencies provides a basis for a number of transmission optimizations. For example, FIG. 6 illustrates processing logic for basing sub carrier transmit power allocations using predicted channel estimates.

For a given predicted channel estimate, processing begins with the prediction of signal-to-noise ratio (SNR) for the corresponding frequency (Step 110). The frequency of interest may, for example, comprise an available data sub carrier frequency whose channel frequency response was predicted by interpolating between pilot sub carrier frequencies. Processing continues with evaluating whether the SNR is below a lower threshold—e.g. below 1 dB—(Step 112). If so, the frequency of interest is deemed unusable and transmit power is not allocated for transmission at that frequency (Step 114). If, on the other hand, the SNR is above the lower threshold, processing continues with selection of the modulation and coding scheme (MCS) based on the predicted SNR, for transmission at the frequency of interest (Step 116). As a non-limiting example, the below table illustrates MCS selection based on predicted SNRs:

| Symbol | Eb/No (dB) (per bit SNR) | R (enc. rate) | Es/No (dB) (per symbol SNR) | Bits/symbol |
| --- | --- | --- | --- | --- |
| 64-QAM | 10 | 1 | 18 | 6 |
| 64-QAM | 7 | 1/2 | 12 | 3 |
| 16-QAM | 3 | 1/2 | 6 | 2 |
| QPSK | 1 | 1/2 | 1 | 1 |
| N/A | — | — | (<1) | 0 |

For every data bit error probability, a symbol set has a lowest SNR per data bit that must be fulfilled. If the noise in the channel is considered white, the SNR per symbol, Es/No, can be calculated from the SNR per data bit Eb/No by $$\frac{E_s}{N_o} = \frac{E_b}{N_o} R \log_2 M \qquad \text{Eq. (7)}$$

where R is the coding rate, M the set size, $N_o$ the noise variance, and $E_s$ and $E_b$ are the energy per symbol and bit, respectively. This SNR is a threshold that must be exceeded if a data transmission with a certain error probability is required. The predicted SNR is calculated by first performing the normal prediction procedure and then deriving the per symbol, i.e., frequency bin, predicted instant SNR as $$S\hat{N}R[k] = 10\log\frac{|\hat{C}[k]|^2}{\sigma_N^2} = \overline{SNR} + 10\log|\hat{C}[k]|^2 \qquad \text{Eq. (8)}$$

where $\overline{SNR}$ is the mean SNR of the channel, which is the quantity to be used in MCS mapping.

Although underlying assumptions can be varied, the above illustrated power allocation process assumes that every different symbol, i.e., waveform, has the same amount of energy and that the total energy sent on the plurality of OFDM sub carriers, or on a defined subset of such carriers, should be constant. With a symbol sent on every sub carrier, the total sent energy is $$E_{total} = \sum_{k=1}^{K} S^2[k] \qquad \text{Eq. (9)}$$

If the prediction shows that not even the most robust choice of coding and modulation can be expected to be successful on certain frequencies, e.g., $S\hat{N}R[k]<1$ dB for some values of k, the corresponding energy can be distributed on the other available sub carriers instead. For example, if $k_o$ sub carriers are excluded, then the energy of the remaining $K-k_o$ symbols can be increased by $K/(K-k_o)$.

The above transmit power allocation process may be performed by the wireless communication device 40 to select sub carriers to be used for its uplink transmissions, based on channel frequency responses predicted from measured downlink channel frequency responses. However, referencing FIG. 1, for example, it will be understood that the transceiver 10, e.g., a base station, may perform transmit power allocation for a plurality of remote transceivers 12, e.g., remote access terminals, based on receiving predicted channel estimates from that plurality of remote transceivers.

FIG. 7 further illustrates a method of using predicted channel frequency responses to optimize transmission across a plurality of transmit frequencies. More particularly, FIG. 7 illustrates a method of assigning subsets of OFDM data sub carriers to respective ones in a plurality of wireless communication receivers. That is, because the channel estimate prediction method taught herein allows a given receiver to estimate channel frequency responses for non-received signal frequencies. As such, a supporting (network) transmitter can determine which frequencies are best for which remote receivers As an example, and with reference to an embodiment of FIG. 1, the transceiver 10 comprises an OFDM-based or other type of wireless communication network base station, and the transceivers 12 comprise remote access terminals, e.g., cellular communication handsets. Processing begins with the assumption that each transceiver 12 measures channel estimates for currently assigned (and received) OFDM sub carrier frequencies, and uses those measurements to predict, via AR modeling, channel estimates for non-received OFDM sub carrier frequencies. In one embodiment, the transceivers 12 individually use autoregression to predict channel frequency responses for one or more pilot sub carrier frequencies outside the received range of pilot sub carrier frequencies, and predict channel estimates for one or more non-received data sub carrier frequencies by interpolating between the channel frequency responses predicted for the pilot sub carrier frequencies.

In any case, it is assumed that measured and predicted channel estimates for a plurality of available OFDM sub carriers are available for the plurality of transceivers 12, and OFDM sub carrier assignment processing thus begins by jointly evaluating the measured and predicted channel estimates (Step 120). Processing continues with assigning particular OFDM data sub carriers to particular transceivers 12 based on the joint evaluation (Step 122). That is, because of frequency-selective fading, some sub carrier frequencies will be better suited for transmission to particular ones of the transceivers 12.

Of course, the present invention is not limited by the foregoing discussion, nor is it limited by the accompanying drawings. Indeed, the present invention is limited only by the following claims, and their legal equivalents.

What is claimed is:

1. A method of using a wireless communication receiver for determining channel estimates for non-received signal frequencies comprising:

determining a plurality of channel frequency responses for a plurality of received signal frequencies;

calculating autoregression coefficients for an autoregression model using the plurality of channel frequency responses;

predicting channel frequency responses for one or more non-received signal frequencies using the autoregression model; and setting an order of the autoregression model as a function of a desired prediction depth.

2. The method of claim 1, wherein determining the plurality of channel frequency responses comprises obtaining a number of frequency response samples from received signal samples for at least some of the received signal frequencies.

3. The method of claim 2, wherein obtaining the frequency response samples comprises obtaining filtered frequency response samples for the at least some received signal frequencies, such that filtered frequency response samples are used in calculating the autoregression coefficients.

4. The method of claim 1, wherein predicting channel frequency responses for one or more non-received signal frequencies using the autoregression model comprises predicting channel frequency responses for one or more signal frequencies outside the received signal frequencies using the autoregression model.

5. The method of claim 1, wherein the order of the autoregression model is based on one or more of an allowed complexity, a delay spread of the channel, and a frequency bandwidth to be used for predicting channel frequency responses.

6. The method of claim 1, wherein determining the plurality of channel frequency responses comprises determining a channel frequency response for at least some sub carriers in a plurality of received Orthogonal Frequency Division Multiplexing (OFDM) sub carriers.

7. The method of claim 6, wherein determining a channel frequency response for at least some sub carriers in a plurality of received Orthogonal Frequency Division Multiplexing (OFDM) sub carriers comprises determining channel frequency responses for one or more received pilot sub carriers, and wherein calculating the autoregression coefficients comprises determining an p-th order autoregression model using at least a portion of the channel frequency responses determined for the received pilot sub carriers.

8. The method of claim 1, wherein determining the plurality of channel frequency responses comprises determining channel frequency responses for received pilot sub carriers in a plurality of received OFDM sub carriers.

9. The method of claim 8, wherein calculating the autoregression coefficients comprises determining an p-th order autoregression model using at least a portion of the plurality of channel frequency responses determined for the received pilot sub carriers.

10. The method of claim 9, further comprising using a portion of the plurality of channel frequency responses determined for the received pilot sub to initialize coefficients of the autoregression model.

11. The method of claim 9, wherein predicting channel frequency responses for one or more non-received signal frequencies using the autoregression model comprises using the autoregression model to predict channel frequency responses for one or more non-received pilot sub carrier frequencies and interpolating as needed between the predicted channel frequency responses to obtain predicted channel frequency responses for data sub carriers at frequencies between the pilot sub carrier frequencies.

12. The method of claim 1, further comprising evaluating predicted channel frequency responses as determined by individual ones in a plurality of wireless communication receivers, and assigning particular ones in a set of available data sub carriers to respective ones of the wireless communication receivers based on said evaluation.

13. A receiver circuit configured to determine channel estimates for non-received signal frequencies, said receiver circuit comprising one or more processing circuits configured to:

determine a plurality of channel frequency responses for a plurality of received signal frequencies;

calculate autoregression coefficients for an autoregression model using the plurality of channel frequency responses;

predict channel frequency responses for one or more non-received signal frequencies using the autoregression model; and wherein the receiver circuit is configured to set an order of the autoregression model as a function of a desired prediction depth.

14. The receiver circuit of claim 13, wherein the receiver circuit is configured to determine the plurality of channel frequency responses by obtaining a number of frequency response samples from received signal samples for at least some of the received signal frequencies.

15. The receiver circuit of claim 14, wherein the receiver circuit is configured to obtain the frequency response samples by obtaining filtered frequency response samples for the at least some received signal frequencies, such that filtered frequency response samples are used in calculating the autoregression coefficients.

16. The receiver circuit of claim 13, wherein the receiver circuit is configured to predict channel frequency responses for one or more non-received signal frequencies using the autoregression model by predicting channel frequency responses for one or more signal frequencies outside the received signal frequencies using the autoregression model.

17. The receiver circuit of claim 13, wherein the order of the autoregression model is based on one or more of an allowed complexity, a delay spread of the channel, and a frequency bandwidth to be used for predicting channel frequency responses.

18. The receiver circuit of claim 13, wherein the receiver circuit is configured to determine the plurality of channel frequency responses by determining a channel frequency response for at least some sub carriers in a plurality of received Orthogonal Frequency Division Multiplexing (OFDM) sub carriers.

19. The receiver circuit of claim 18, wherein the receiver circuit is configured to calculate the autoregression coefficients by initializing an p-th order autoregression model using the plurality of channel frequency responses.

20. The receiver circuit of claim 13, wherein the receiver circuit is configured to determine the plurality of channel frequency responses by determining channel frequency responses for one or more pilot sub carriers in a plurality of received OFDM sub carriers.

21. The receiver circuit of claim 20, wherein the receiver circuit is configured to calculate the autoregression coefficients by determining an p-th order autoregression model using at least a portion of the plurality of channel frequency responses determined for the received pilot sub carriers.

22. The receiver circuit of claim 21, wherein the receiver circuit is configured to initialize coefficients of the p-th order autoregression model using at least a portion of the plurality of channel frequency responses determined for the received pilot sub carriers.

23. The receiver circuit of claim 21, wherein the receiver circuit is configured to predict channel frequency responses for one or more non-received signal frequencies by using the autoregression model to predict channel frequency responses for one or more non-received pilot sub carrier frequencies and interpolating as needed between the predicted channel frequency responses to obtain predicted channel frequency responses for data sub carriers at frequencies between the pilot sub carrier frequencies.

24. A method of assigning subsets of OFOM data sub carriers to respective ones in a plurality of wireless communication receivers comprising:
   for each wireless communication receiver, measuring channel estimates for OFOM sub carrier frequencies currently assigned to the wireless communication receiver, and predicting channel estimates for OFDM sub carrier frequencies not currently assigned to the wireless communication receiver via autoregression modeling based on the measured channel estimates;
   jointly evaluating measured and predicted channel estimates for the wireless communication receivers; and
   assigning particular OFDM data sub carriers to particular wireless communication receivers based on said joint evaluation.

25. A method of using a wireless communication receiver for determining channel estimates for non-received signal frequencies comprising:
   determining a plurality of channel frequency responses for a plurality of received signal frequencies;
   calculating autoregression coefficients for an autoregression model using the plurality of channel frequency responses;
   predicting channel frequency responses for one or more non-received signal frequencies using the autoregression model; and
   wherein an order of the autoregression model is based on one or more of an allowed complexity, a delay spread of the channel, and a frequency bandwidth to be used for predicting channel frequency responses.

26. A receiver circuit configured to determine channel estimates for non-received signal frequencies, said receiver circuit comprising one or more processing circuits configured to:
   determine a plurality of channel frequency responses for a plurality of received signal frequencies;
   calculate autoregression coefficients for an autoregression model using the plurality of channel frequency responses;
   predict channel frequency responses for one or more non-received signal frequencies using the autoregression model; and
   wherein an order of the autoregression model is based on one or more of an allowed complexity, a delay spread of the channel, and a frequency bandwidth to be used for predicting channel frequency responses.

* * * * *

UNITED STATES PATENT AND TRADEMARK OFFICE
CERTIFICATE OF CORRECTION

PATENT NO. : 7,680,218 B2  Page 1 of 1
APPLICATION NO. : 11/438874
DATED : March 16, 2010
INVENTOR(S) : Wilhelmsson et al.

It is certified that error appears in the above-identified patent and that said Letters Patent is hereby corrected as shown below:

In Column 10, Line 39, delete "us." and insert -- µs. --, therefor.

In Column 13, Line 53, in Claim 10, delete "pilot sub" and insert -- pilot sub carriers --, therefor.

In Column 15, Line 7, in Claim 24, delete "OFOM" and insert -- OFDM --, therefor.

In Column 15, Line 11, in Claim 24, delete "OFOM" and insert -- OFDM --, therefor.

Signed and Sealed this

Thirteenth Day of July, 2010

David J. Kappos
*Director of the United States Patent and Trademark Office*